March 26, 1929.     H. V. NYE     1,706,807
SYSTEM OF DISTRIBUTION
Filed April 17, 1922
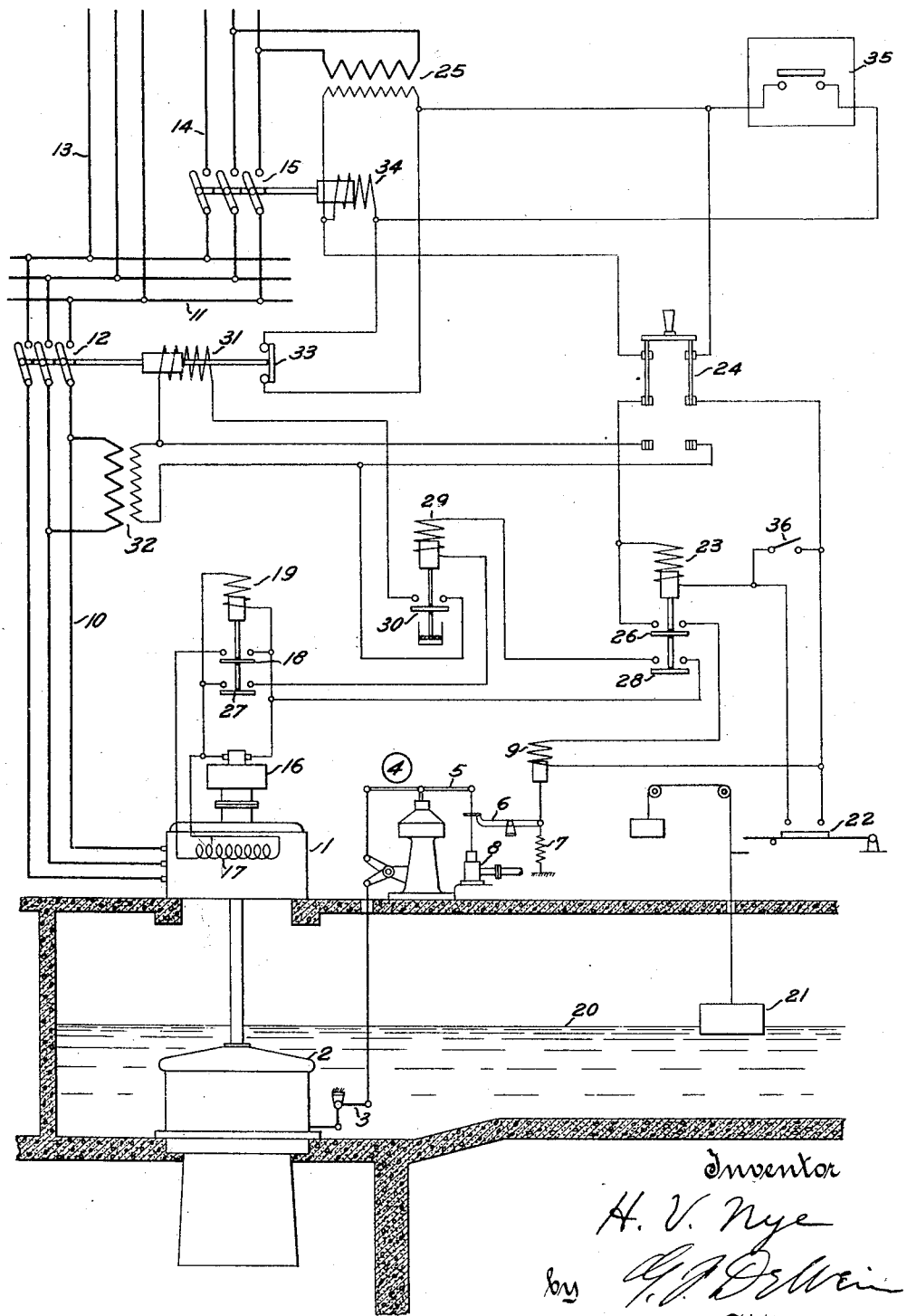

Patented Mar. 26, 1929.

1,706,807

UNITED STATES PATENT OFFICE.

HENRY V. NYE, OF WEST ALLIS, WISCONSIN, ASSIGNOR TO ALLIS-CHALMERS MANUFACTURING COMPANY, OF MILWAUKEE, WISCONSIN, A CORPORATION OF DELAWARE.

SYSTEM OF DISTRIBUTION.

Application filed April 17, 1922. Serial No. 553,714.

This invention relates to systems of distribution and more particularly to such systems involving automatically operated prime mover generator plants. It is particularly applicable in connection with such plants of the type driven by hydraulic turbines. In small installations of this character there is not always the same amount of operating fluid available so that at times it will be possible to operate the prime mover and at others not. It is desirable in such cases that the prime mover generator unit or units be automatically started and stopped in response to the supply of available fluid. Such plants are usually made connectible to a distribution system which may be supplied with power from some other source which may, for example, be a distantly located steam plant. The automatically operated plant may also supply power, for example, for some other portion of the distribution system not ordinarily supplied by the steam plant, or some other more or less independent system. It is accordingly an object of this invention to provide a simple and efficient automatically operated prime mover generator plant to satisfy the hereinbefore mentioned requirements. Ancillary to this object is the provision of such a system using a minimum number of relays.

Another object of the invention is the provision of an automatic system in which the generator is directly connected to the line after the field thereof is energized.

A further object of the invention is the provision of a governor-controlled automatically operated prime mover generator plant.

A still further object is the provision of a power distribution system, including an automatically operated prime mover generator plant, in which the latter supplies power to a portion of the system during a predetermined period of time, and in which said portion of the system supplies power to another portion of the system if said prime mover generator plant is not running.

Other objects will appear hereinafter as the description of the invention proceeds.

The novel features of the invention will appear from this specification and the accompanying drawing forming a part thereof and disclosing one embodiment of said invention, and all these novel features are intended to be pointed out in the claims.

The single figure of the drawing is a diagrammatic showing of a system of distribution in which the invention has been applied.

The system includes an alternating current generator 1 driven, in this instance, by a hydraulic turbine 2. The turbine is provided with a gate operating mechanism 3 which is controlled by a speed governor 4. This governor has been diagrammatically illustrated as it may be of a conventional type ordinarily used for the control of hydraulic turbines. The governor is here shown as including a floating lever 5 which is positioned in the usual manner by a speed responsive means within the governor and by the gate operating means. In accordance with this invention the governor is provided with a control lever 6 which may be biased by a spring 7 so that the lever 6, when the spring is permitted to act, will lift the right hand end, as here shown, of the floating lever 5, so that a control valve 8 admitting fluid to the governor mechanism is placed in a position corresponding to closure of the gate mechanism 3. The bias of the spring 7 may be overcome by means of a solenoid 9.

The generator 1 is connectible to main buses 11, through an automatic contactor 12. The buses 11 may have connected thereto the feeders 13 which may, for example, lead to a local distribution circuit. Another set of feeders 14 is here shown as connectible to the buses 11 through an automatic contactor 15. The feeders 14 may lead to a distant power generating station.

The generator 1 is here shown as having direct-connected thereto an exciter 16 which is adapted to supply the field winding 17 of the generator through the contacts 18 of a relay 19. In this description relays are designated by their operating magnets.

The turbine 2 is here shown as under a head of water having the level 20. As this level varies it carries with it a float 21 which may be arranged in any suitable manner to actuate a switch 22.

The system will be best understood by a description of the operation thereof when the level 20 rises a sufficient amount so that the float 21 will cause closure of the switch 22.

When this occurs a relay 23 is energized from the secondary of a transformer 25 connected across two of the feeders 14. With the parts in the position shown in the drawing the current to relay 23 passes through the upper contacts of a double throw switch 24. Actuation of relay 23 closes contacts 26, 28. The closure of contacts 26 energizes solenoid 9 from transformer 25, thereby relieving governor 4 of the control of lever 6. The valve 8 is then free to assume a position in which fluid is admitted to the governor to actuate the gate operating mechanism 3 to an open position. Water being thus admitted to turbine 2, the generator 1 will be driven without load thereon and as the speed rises the exciter 16 will build up its voltage, and when this voltage is sufficiently high relay 19 is effectively energized thereby directly connecting the field windings 17 to the exciter through contacts 18, and at the same time closing contacts 27.

Upon closure of contacts 27, relay 29 will be energized, from the exciter, inasmuch as contacts 28 have been previously closed by relay 23. Relay 29 is of the retarded type and after a predetermined time sufficient for the generator to reach normal speed, it closes contacts 30. The closure of contacts 30 energizes the operating magnet 31 of the automatic contactor 12, from the secondary of the transformer 32 fed from the generator leads 10. Energization of magnet 31 closes contactor 12 and connects generator 1 directly to the buses 11. Generator 1 of course now supplies power to any feeders which may be connected to buses 11.

Assuming that the feeders 14 are connected to a distant generating station, it may become desirable to supply the system to which feeders 14 are connected with any surplus power which may be available from the automatic hydro-electric plant. This is usually the case during certain times of the day during peak loads. In order to provide for this a time switch 35 may be connected so that when it closes an operating magnet 34 will be energized and actuate the automatic contactor 15 whereby the feeders 14 will be connected to the buses 11. At a predetermined time the time switch 35 will act to deenergize magnet 34 thereby opening contactor 15. It is, however, desirable that the contactor 15 be not opened at said predetermined time if the automatic hydro-electric plant is not in operation. This is accomplished by providing the automatic contactor 12 with an auxiliary switch 33 which when the contactor 12 is in open position closes a shunt circuit for energizing the magnet 34, thereby holding the contactor 15 in closed position. The buses 11 will thus be energized so that feeders, such as 13 may be operated when the hydro-electric plant is dead.

A manually operable switch 36 may be provided by which the hydro-electric unit may be started manually, the switch 36 being connected in shunt with switch 22.

If it should happen that the feeders 14 are not energized at a time when the unit is not running, it may be manually started by throwing the switch 24 to its lower position whereby the control circuits may be energized from transformer 32 after the unit gets up to speed. In this case the lever 6 may be operated by hand until sufficient current is supplied to solenoid 9 by transformer 32.

If the water level 20 falls to a point resulting in the opening of switch 22 the relay 23 will be deenergized thereby also deenergizing the solenoid 9 whereby the turbine is shut down. The opening of relay 23 also deenergizes relay 29 and consequently also the automatic contactor 12, disconnecting the generator from the buses 11. As the turbine slows down, the exciter voltage drops deenergizing relay 19 thereby opening the generator field circuit.

The unit may also be stopped by temperature relays for the bearings, an over voltage relay to prevent runaway speed, over load relays, etc., all not shown.

It should be understood that it is not desired to limit the invention to the exact details of construction shown and described, for obvious modifications will occur to a person skilled in the art.

It is claimed and desired to secure by Letters Patent:

1. In combination, a distribution circuit, a generator, a prime mover, a governor, including a control valve, and means for controlling the admission of operating fluid to start said prime mover and bring it up to speed and for maintaining the speed thereof substantially constant under varying load, means for releasably holding said control valve in its position corresponding to the closed position of said fluid admission controlling means, means responsive to the supply of operating fluid for said prime move for releasing said control valve, and means automatically operative when said generator reaches a predetermined speed for connecting said generator to said distribution circuit.

2. In combination, a distribution circuit, a generator, a prime mover, a governor, including a control valve, and means for controlling the admission of operating fluid to start said prime mover and bring it up to speed and for maintaining the speed thereof substantially constant under varying load, means for releasably holding said control valve in its position corresponding to the closed position of said fluid admission controlling means; means responsive when the supply of operating fluid for said prime mover reaches a predetermined amount for releasing said control valve to cause said governor to admit fluid to said prime mover, and means automatically operative when said generator reaches a predetermined speed for connecting said generator to said distribution circuit.

3. In combination, a distribution circuit, a generator, a prime mover, a governor for said prime mover, a switch controlled by means responsive to the supply of operating fluid for said prime mover, a relay controlled by said switch, a solenoid controlled by said relay, for controlling said governor, an exciter for said generator driven by said prime mover, a relay responsive to exciter voltage, an electromagnetically operated switch for connecting said generator to said distribution circuit, a retarded relay for controlling said electromagnetically operated switch, said retarded relay being controlled jointly by said first two named relays.

4. In combination, a distribution circuit, a generator, a prime mover, an exciter for said generator, means for starting said prime mover from rest from a distant point, means for directly connecting said exciter to the generator field winding in response to a predetermined exciter voltage before said generator is connected to said distribution system, and means responsive to the action of said last named means for connecting said generator to said distribution circuit after a predetermined time.

5. In combination, a distribution circuit, a generator, a prime mover, means for starting said prime mover from rest from a distant point, means for fully exciting said generator when it has reached substantially synchronous speed and is still disconnected from said distribution circuit, and means for thereafter connecting said generator directly to said distribution circuit.

6. In combination, a distribution circuit, a prime mover, a generator and an exciter therefor driven by said prime mover, means responsive to the supply of fluid for said prime mover, and means for connecting said generator to said distribution circuit controlled jointly by the exciter voltage and said fluid-supply-responsive means.

7. The combination with a prime mover generator plant automatically started and stopped in response to the fluid supply for the prime mover, of a distribution circuit, and time-controlled means for disconnecting said distribution circuit from said generator at a predetermined time if said prime mover generator plant is in operation.

8. The combination with a prime mover generator plant automatically started and stopped in response to the fluid supply for the prime mover, including an exciter for said generator, of a distribution circuit, and means whereby when said fluid-supply-responsive means acts to disconnect said generator from said distribution circuit said exciter will remain connected to said generator until the speed thereof has dropped a predetermined amount.

9. The combination with a prime mover generator plant automatically started and stopped in response to the fluid supply for the prime mover, of a distribution circuit capable of supplying power, a second distribution circuit to which power may be supplied by said first circuit and by said plant, and time-controlled means for disconnecting said first circuit from said second circuit at a predetermined time if said plant is in operation.

10. In combination, a distribution circuit, a generator and an exciter therefor, means including a relay having an operating coil for causing the connection of said generator to said distribution circuit when said relay is operated, two switches jointly controlling said operating coil, means responsive to a predetermined exciter voltage for closing one of said switches, and means responsive to a master control switch for closing the other of said switches.

11. In combination, a distribution circuit, a generator and an exciter therefor, means including a retarded relay having an operating coil for causing the connection of said generator to said distribution circuit when said relay is operated, two switches jointly controlling said operating coil, means responsive to a predetermined exciter voltage for closing one of said switches, and means responsive to a master control switch for closing the other of said switches.

12. In combination, a distribution circuit, a generator, a prime mover, a fluid pressure operated governor for said prime mover including regulating means for controlling the admission of operating fluid to said prime mover, and a control valve for controlling the admission of fluid under pressure to said regulating means, means for releasably holding said control valve in its position corresponding to the closed position of said prime mover operating fluid admitting means, means for releasing said control valve to permit said governor to start and regulate said prime mover, means operable from a distant point for controlling said releasing means, and means automatically operative when said generator reaches a predetermined speed for causing the connection of said generator to said distribution circuit.

13. In combination, a distribution circuit, a generator, a prime mover, means for controlling the admission of operating fluid to said prime mover and for maintaining the speed thereof substantially constant under varying load, means electrically operable from a distant point for controlling said first named means, and means including an exciter for said generator driven by said prime mover automatically operative when said generator reaches a predetermined speed for causing the connection of said generator to said distribution circuit.

14. In combination, a distribution circuit, a generator, a prime mover, a governor for said prime mover comprising regulating means for controlling the admission of fluid to said prime mover, and a control valve for controlling said regulating means, means for biasing said control valve to its position corresponding to the closed position of said fluid admitting means, means for overcoming said bias and freeing said control valve to permit said governor to start and regulate said prime mover, means electrically operable from a distant point for controlling said freeing means, and means automatically operative when said generator reaches a predetermined speed for causing the connection of said generator to said distribution circuit.

15. In combination, a distribution circuit, a generator, a prime mover, means for starting said prime mover from rest from a distant point, means effectively operated when said generator is still disconnected from said distribution circuit for exciting said generator to an extent sufficient to cause the same to be pulled into step when it is connected to said distribution circuit at substantially synchronous speed, and means for thereafter connecting said generator to said distribution circuit.

16. In combination, a distribution circuit, a generator, a prime mover, a fluid pressure operated governor for said prime mover including regulating means for controlling the admission of operating fluid to said prime mover, and a control valve for controlling the admission of fluid under pressure to said regulating means, means for biasing said control valve to its position corresponding to the closed position of said prime mover operating-fluid admitting means, means for overcoming said bias to cause said control valve to move to a position in which it admits fluid under pressure to said regulating means to start said prime mover and permits said governor to regulate said prime mover, means operable from a distant point for controlling said bias-overcoming means, and means automatically operative when said generator reaches a predetermined speed for causing the connection of said generator to said distribution circuit.

17. In combination, a distribution circuit, a generator, a prime mover, means for controlling the admission of operating fluid to said prime mover and for maintaining the speed thereof substantially constant under varying load, means electrically operable from a distant point for controlling said first mentioned means, and means including an exciter for said generator automatically operative when said generator reaches a predetermined speed for causing the connection of said generator to said distribution circuit.

18. In combination, a distribution circuit, a generator, a prime mover, means for controlling the admission of operating fluid to said prime mover and for maintaining the speed thereof substantially constant under varying load, means electrically operable from a distant point for controlling said first mentioned means, and means, including an exciter for said generator and means dependent on the development by said exciter of a predetermined voltage, automatically operative when said generator reaches a predetermined speed for causing the connection of said generator to said distribution circuit.

19. In combination, a distribution circuit, a generator, a prime mover, a governor provided with a valve for controlling the admission of fluid to the governor mechanism and including means for controlling the admission of operating fluid to start said prime mover and bring it up to speed and for maintaining the speed thereof substantially constant under varying load, a solenoid operatively associated with said valve for causing the admission of fluid to said governor mechanism when said solenoid is energized to thereby start said prime mover, a master control relay energizable from a distant point, said master relay having a contact controlling the circuit of said solenoid, and means automatically operative when said generator reaches a predetermined speed for connecting said generator to said distribution circuit.

20. In combination, a distribution circuit, a generator, a prime mover, means including electro-responsive means for controlling the admission of operating fluid to start said prime mover and bring it up to speed, means for controlling the connection between said generator and said distribution circuit, and a master relay having a contact for controlling said electro-responsive means whereby when said relay is energized said admission controlling means causes said prime mover to start and bring it up to speed, said master relay having another contact for controlling said connection controlling means to cause the connection between said generator and said distribution circuit to be interrupted when said master relay is deenergized.

21. In combination, a distribution circuit, a generator, a prime mover, means including electro-responsive means for controlling the admission of operating fluid to start said prime mover and bring it up to speed, an exciter for said generator driven by said prime mover, means dependent on the development by said exciter of a predetermined voltage for controlling the connection between said generator and said distribution circuit, and a master relay having a contact for controlling said electro-responsive means whereby when said relay is energized said admission controlling means causes said prime mover to start and bring it up to speed, said master relay having another contact for controlling said connection controlling means to cause the connection between said generator and said distribution circuit to be interrupted when said master relay is deenergized.

22. In combination, a distribution circuit, a generator, a prime mover, a governor provided with a valve for controlling the admission of fluid to the governor mechanism and including means for controlling the admission of operating fluid to start said prime mover and bring it up to speed and for maintaining the speed thereof substantially constant under varying load, a solenoid operatively associated with said valve for causing the admission of fluid to said governor mechanism when said solenoid is energized to thereby start said prime mover, means for controlling the connection between said generator and said distribution circuit, a master relay having a contact for controlling said solenoid whereby when said relay is energized said admission controlling means causes said prime mover to start, said master relay having another contact for controlling said connection controlling means to cause the connection between said generator and said distribution circuit to be interrupted when said master relay is deenergized.

23. In combination, a distribution circuit, a generator, a prime mover, a governor provided with a valve for controlling the admission of fluid to the governor mechanism and including means for controlling the admission of operating fluid to start said prime mover and bring it up to speed and for maintaining the speed thereof substantially constant under varying load, a solenoid operatively associated with said valve for causing the admission of fluid to said governor mechanism when said solenoid is energized to thereby start said prime mover, a master control relay energizable from a distant point, said master relay having a contact controlling the circuit of said solenoid, and means including an exciter for said generator driven by said prime mover automatically operative when said generator reaches a predetermined speed for connecting said generator to said distribution circuit.

In testimony whereof, the signature of the inventor is affixed hereto.

HENRY V. NYE.